United States Patent Office 3,520,895
Patented July 21, 1970

3,520,895
1-SUBSTITUTED-1,2,3,4-TETRAHYDROBENZO-THIENO[2,3-C]PYRIDINES
John T. Suh, Mequon, Wis., assignor to Colgate-Palmolive Company, New York, N.Y., a corporation of Delaware
No Drawing. Continuation-in-part of application Ser. No. 621,471, Mar. 8, 1967. This application Feb. 16, 1968, Ser. No. 705,909
Int. Cl. C07d 63/18
U.S. Cl. 260—294.8          6 Claims

ABSTRACT OF THE DISCLOSURE

The compounds are 1-lower alkyl-1,2,3,4-tetrahydrobenzothieno[2,3-C]pyridines useful as antipsychotic and antihypertensive agents. A compound disclosed is 1-ethyl-1,2,3,4-tetrahydrobenzothieno[2,3-C]pyridine.

RELATED CASE

The present application is a continuation-in-part of my copending application Ser. No. 621,475, filed Mar. 8, 1967, now abandoned.

DETAILED DESCRIPTION

The compounds of the present invention have the following formula:

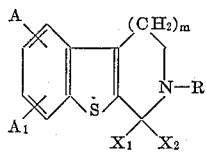

wherein A and $A_1$ are selected from hydrogen, hydroxy, nitro, lower alkyl groups of 1 to 4 carbon atoms such as methyl, ethyl or isopropyl, lower alkoxy groups such as methoxy, ethoxy and propoxy, halo such as bromo, chloro and fluoro and trifluoromethyl, $m$ is 1 or 2, R is a group selected from hydrogen, a lower alkyl of 1 to 4 carbon atoms, an aralkyl of 7 to 11 carbon atoms, such as benzyl, phenethyl and phenylisopropyl and including halo and lower alkoxy substituted phenyl-lower alkyls such as o-chlorobenzyl and p-methoxybenzyl, $(CH_2)_n$—OH in which $n$ is 2 to 6, and B—Am in which B is an alkylene of 2 to 6 carbon atoms and Am is selected from (a)

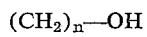

in which $R_1$ and $R_2$ may be the same or different groups selected from hydrogen, lower alkyl of 1 to 4 carbon atoms, lower alkyl-tertiaryamino such as diethylaminoethyl, hydroxy-lower alkyl such as hydroxy-ethyl, a lower alkenyl of 3 to 6 carbon atoms such as allyl and hexenyl, phenyl, nuclear substituted phenyl, particularly a halophenyl such as o-chlorophenyl and an alkoxyphenyl such as p-methoxyphenyl, cycloalkyl groups, particularly those containing 3 to 7 carbon atoms and including cyclohexyl and cyclopentyl, cycloalkyl-lower alkyl groups, particularly those in which the cycloalkyl contains 3 to 7 carbon atoms such as cyclohexyl-methyl and cyclopentyl-ethyl, (b) groups in which

represents an amino group such as morpholino, pyrrolidino, piperidino, N-lower alkyl piperazino groups such as N-methyl-piperazino, N-(phenyl-lower alkyl)-piperazino groups such as N-benzylpiperazino and 4-(alpha-methylphenethyl)-piperazino and N-(hydroxy-lower alkyl)-piperazino groups such as 4-(beta-hydroxyethyl)-piperazino, and (c) Am is a cyclic amine group bonded through a nuclear carbon to B, including such groups as N-lower alkyl-2,3 or 4-piperidyls such as N-methyl-3-piperidyl, N-ethyl-4-piperidyl, N-ethyl-2-piperidyl and N-isopropyl-3-piperidyl, N-(di-lower alkyl amino-lower alkyl)-2,3 or 4-piperidyls such as N-(beta-dimethylaminopropyl)-4-piperidyl, N-(beta-diethylaminoethyl) - 3-piperidyl and N-(beta-dimethylaminopropyl) - 2-piperidyl, N-phenyl-lower alkyl - 3 or 4-piperidyls such as N-benzyl - 3-piperidyl, N-phenylethyl - 4-piperidyl and N-phenylpropyl-3-piperidyl, 2-piperidyl, 3-piperidyl and 4-piperidyl, 2-pyrrolidyl, 3-pyrrolidyl, N-lower alkyl-2 or 3-pyrrolidyls such as N-methyl - 2-pyrrolidyl, N-ethyl - 3-pyrrolidyl, N-propyl - 4-pyrrolidyl, and N-phenyl-lower alkyl-2 or 3-pyrrolidyls such as N-benzyl-2-pyrrolidyl and N-phenyl-ethyl-3-pyrrolidyl, $X_1$ is hydrogen or lower alkyl and $X_2$ is hydrogen, a lower alkyl of 1 to 4 carbon atoms, phenyl including a nuclear substituted phenyl, particularly a halophenyl such as o-chlorophenyl, or an alkoxyphenyl such as p-methoxyphenyl, aralkyl of 7 to 11 carbon atoms such as benzyl, phenethyl and phenylisopropyl and including nuclear substituted aralkyls, particularly halo and lower alkoxy substituted phenyl-lower alkyls, such as o-chlorobenzyl and dimethoxybenzyl, a heterocyclic such as pyridyl, piperidyl, furyl, thienyl, pyrryl and pyrrolidyl or B—Am.

The basic starting materials employed in the preparation of the compounds of the present invention are β-(3-thianaphthenyl)alkylamines of the formula

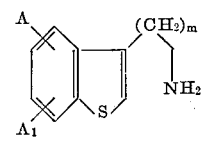

These amines may be prepared from the corresponding cyano compounds as described in the literature. [Herz J.A.C.S. 72, p. 4999 (1950)].

The starting materials may also be prepared by treating the corresponding acid with thionyl chloride followed by treatment with sodium azide and acid hydrolysis. The process may be illustrated as follows:

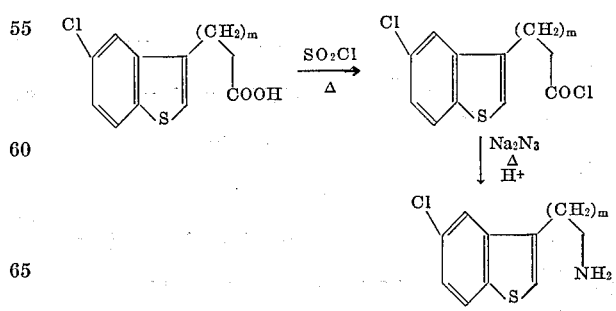

Representative of the amines which may be employed are the following:

β-(3-thianaphthenyl)ethylamine,
β-(5-chloro-3-thianaphthenyl)ethylamine,

β-(5-hydroxy-3-thianaphthenyl)ethylamine,
β-(6-trifluoromethyl-3-thianaphthenyl)ethylamine,
β-(7-methoxy-3-thianaphthenyl)ethylamine,
β-(4-bromo-3-thianaphthenyl)ethylamine, and
γ-(3-thianaphthenyl)propylamine.

The compounds of the present invention which are represented by the formula

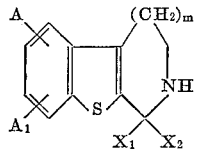

wherein $X_1$ is hydrogen may be prepared by treating a β-(3-thianaphthenyl)ethylamine with a suitable aldehyde in a concentrated liquid organic acid such as glacial acetic acid.

The above described process may be diagrammed as follows:

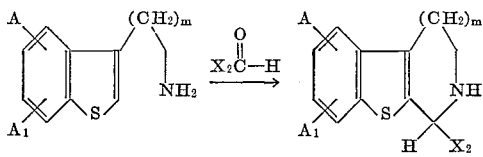

wherein A and $A_1$ are as described and do not interfere with or partake in the reaction.

Representative of the aldehydes which may be employed in the described process are the following:

Pyridine-4-carboxaldehyde,
Pyridine-2-carboxaldehyde,
Benzaldehyde,
p-Methoxybenzaldehyde,
Dimethylaminobenzaldehyde,
2-furaldehyde,
2-pyrrolicarboxaldehyde,
3-pyrrolecarboxaldehyde,
2-thiophenecarboxaldehyde, and
3-thiophenecarboxaldehyde.

Representative of the compounds which may be prepared by the described process are the following:

1-(p-chlorophenyl)-1,2,3,4-tetrahydrobenzothieno[2,3-C]pyridine,
1-(4-pyridyl)-1,2,3,4-tetrahydrobenzothieno[2,3-C]pyridine,
1-phenyl-1,2,3,4-tetrahydrobenzothieno[2,3-C]pyridine,
1-phenyl-1,2,3,4-tetrahydro-5H-benzothieno[2,3-C]azepine,
1-ethyl-1,2,3,4-tetrahydro-5H-benzothieno[2,3-C]azepine,
1-(p-chlorophenyl)-1,2,3,4-tetrahydro-5H-benzothieno[2,3-C]azepine,
1-(p-trifluoromethylphenyl)-1,2,3,4-tetrahydro-5H-benzothieno[2,3-C]azepine,
1-(2'-pyridyl)-1,2,3,4-tetrahydro-5H-benzothieno[2,3-C]azepine,
1-(p-methoxyphenyl)-1,2,3,4-tetrahydrobenzothieno[2,3-C]pyridine,
1-(p-trifluoromethylphenyl)-6-hydroxy-1,2,3,4-tetrahydrobenzothieno[2,3-C]pyridine,
1-(2'-pyridyl)-7-methoxy-1,2,3,4-tetrahydrobenzothieno[2,3-C]pyridine,
1-(2'-furyl)-5-bromo-1,2,3,4-tetrahydrobenzothieno[2,3-C]pyridine,
1-(m-dimethylaminophenyl)-6-trifluoromethyl-1,2,3,4-tetrahydrobenzothieno[2,3-C]pyridine,
1-(2'-thienyl)-7-methoxy-1,2,3,4-tetrahydrobenzothieno[2,3-C]pyridine,
1-(3',4'-dihydroxyphenyl)-5-chloro-1,2,3,4-tetrahydrobenzothieno]2,3-C[pyridine,
1,2,3,4-tetrahydrobenzothieno[2,3-C]pyridine,
1-(3',4',5'-trimethoxy)-8-fluoro-1,2,3,4-tetrahydrobenzothieno[2,3-C]pyridine, and
1-(3'-furyl)-6-hydroxy-1,2,3,4-tetrahydrobenzothieno[2,3-C]pyridine.

The compounds which are represented by the formula

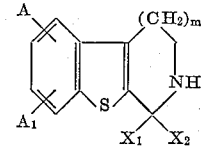

in which $X_1$ is other than hydrogen may be prepared by a variety of methods. The compounds in which $X_1$ is methyl may be prepared by treating an appropriate amine with a methyl ketone in the presence of a p-toluenesulfonic acid and toluene followed by treatment with an acid such as hydrogen chloride in an inert solvent such as ether. The described process may be illustrated as follows:

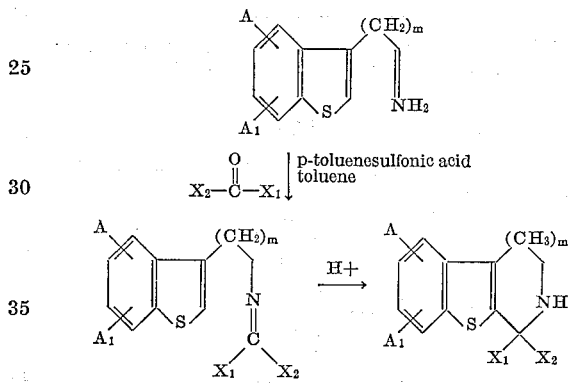

wherein $X_1$ is methyl and $A_1$ and $A_2$ are as described and represent groups that do not partake in or interfere with the reaction.

Representative of the ketones which may be employed in the described process are the following:

Acetone,
Methyl ethyl ketone,
3-pentanone,
2-pentanone, and
Acetophenone.

Representative of the compounds which may be prepared by the described process are the following:

1,1-dimethyl-1,2,3,4-tetrahydrobenzothieno[2,3-C]pyridine,
1-ethyl-1-methyl-1,2,3,4-tetrahydrobenzothieno[2,3-C]pyridine,
1-methyl-1-phenyl-1,2,3,4-tetrahydrobenzothieno[2,3-C]pyridine,
1-methyl-1-phenyl-1,2,3,4-tetrahydro-5H-benzothieno[2,3-C]azepine, and
1,1-dimethyl-1,2,3,4-tetrahydro-5H-benzothieno[2,3-C]azepine.

The compounds in which $X_1$ is hydrogen and $X_2$ is alkyl or aralkyl may also be prepared by first treating the corresponding amine with a conventional acylating agent such as an acyl halide, anhydride or ester, in a suitable solvent such as benzene, toluene or xylene, preferably at reflux temperature to form the corresponding amide. The resulting amide is then treated with phosphorus pentoxide and phosphorus oxychloride in a suitable anhydrous medium such as xylene or toluene, to form the ring unsaturated 3,4-dihydrothianaphthieno[2,3-C]pyridine derivative which upon treatment with lithium aluminum hydride yields the desired ring saturated compound.

The above described process may be illustrated as follows:

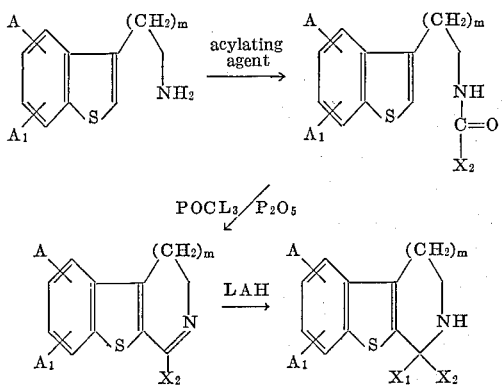

wherein A and $A_1$ are as described and represent groups that do not interfere with or partake in the reactions.

Representative of the acylating agents which may be employed are the following:

Acetyl chloride,
Acetyl bromide,
Acryloyl chloride,
β-Nitropropionyl chloride,
Propionyl chloride,
Propionyl iodide,
n-Butyryl chloride,
Benzoyl chloride,
Acetic anhydride,
Propionic anhydride,
Ethyl formate,
Benzyl formate,
γ-(N-methylpiperazino)butyryl chloride,
β-(N-methylpiperazino)propionyl chloride,
β-(Morpholino)propionyl chloride,
β-[3-(N-methyl)pyrrolidyl]propionyl chloride, and
γ-(Piperidyl)butyryl chloride.

Representative of some of the amides prepared by the process are the following:

N-acetyl-β-(3-thianaphthenyl)ethylamine,
N-acetyl-γ-(3-thianaphthenyl)propylamine,
N-3-nitropropionyl-β-(3'-thianaphthenyl)ethylamine,
N-3-nitropropionyl-γ-(3'-thianaphthenyl)propylamine,
N-(3,4-dimethoxyphenylacetyl)-β-(3-thianaphthenyl)ethylamine,
N-(3,4-dimethoxyphenylacetyl)-γ-(3-thianaphthenyl)propylamine,
N-acryloyl-β-(3-thianaphthenyl)ethylamine,
N-acryloyl-γ-(3-thianaphthenyl)propylamine,
N-propionyl-β-(3-thianaphthenyl)ethylamine,
N-propionyl-γ-(3-thianaphthenyl)-propylamine,
N-(p-methoxyphenylacetyl)-β-(3-thianaphthenyl)ethyl amine,
N-(p-methoxyphenylacetyl)γ-(3-thianaphthenyl) propylamine,
N-iso-butyryl-β-(3-thianaphthenyl)ethylamine,
N-iso-butyryl-γ-(3-thianaphthenyl)propylamine,
N-butyryl-β-(3-thianaphthenyl)ethylamine,
N-butyryl-γ-(3-thianaphthenyl)propylamine,
N-[β-(N'-methylpiperazino)propionyl]-β'-(3-thianaphthenyl)ethylamine,
N-[β-(N'-methylpiperazino)propionyl]-γ-(3-thianaphthenyl)propylamine,
N-methyl-N-[β-(diethylamino)propionyl]-β'-(5-chloro-3-thianaphthenyl)ethylamine,
N-methyl-N-[β-(diethylamino)propionyl]-γ-(5-chloro-3-thianaphthenyl)propylamine,
N-β-morpholinopropionyl-β'-(6-trifluoromethyl-3-thianaphthenyl)ethylamine,
N-β-[3-(N-et hyl)pyrrolidyl]-β'-(7'-methoxy-3'-thianaphthenyl)ethylamine,
N-dimethylaminoacetyl-β-(5-fluoro-3-thianaphthenyl)ethylamine,
N-dimethylaminoacetyl-γ-(5-fluoro-3-thianaphthenyl)propylamine,
N-γ-(diethylamino)butyryl-β'-(5-hydroxy-3-thianaphthenyl)ethylamine,
N-γ-(diethylamino)butyryl-γ-(5-hydroxy-3-thianaphthenyl)propylamine.
N-β-(N'-hydroxyethylpiperazino)propionyl-β'-(5-trifluoromethyl-3-thianaphthenyl)ethylamine, and
N-β-(N'-hydroxyethylpiperazino)propionyl-γ-(5-trifluoromethyl-3-thianaphthenyl)propylamine.

Representative of some of the 3,4-dihydrobenzothieno[2,3-C]pyridines, 3,4-dihydro - 5H - benzothieno[2,3-C] azepines, 1,2,3,4-tetrahydrobenzothieno[2,3 - C]pyridines and 1,2,3,4-tetrahydro-5H - benzothieno[2,3 - C]azepines which may be prepared are the following:

1-iso-propyl-3,4-dihydrobenzothieno[2,3-C]pyridine,
1-iso-propyl-3,4-dihydro-5H-benzothieno[2,3-C]azepine,
1-(β-diethylaminoethyl)-6-hydroxy-3,4-dihydrobenzothieno[2,3-C]pyridine,
1-(β-diethylaminoethyl)-6-hydroxy-3,4-dihydro-5H-benzothieno[2,3-C]azepine,
1-methyl-3,4-dihydrobenzothieno[2,3-C]pyridine,
1-methyl-3,4-dihydro-5H-benzothieno[2,3-C]azepine,
1-(3',4'-dimethoxyphenyl)-3,4-dihydrobenzothieno[2,3-C]pyridine,
1-(3',4'-dimethoxyphenyl)-3,4-dihydro-5H-benzothieno-[2,3-C]azepine,
6-chloro-1-ethyl-3,4-dihydrobenzothieno[2,3-C]pyridine,
6-chloro-1-ethyl-3,4-dihydro-5H-benzothieno[2,3-C]azepine,
1-[4'-(N-methylpiperidyl)]-7-trifluoromethyl-3,4-dihydrobenzothieno[2,3-C]pyridine,
1-[4'-(N-methylpiperidyl)]-7-trifluoromethyl-3,4-dihydro-5H-benzothieno[2,3-C]azepine,
1-[β-(N-hydroxyethylpiperazino)ethyl]-7-methoxy-3,4-dihydrobenzothieno[2,3-C]pyridine,
6-hydroxy-1-(N-methylpiperazinoethyl)-3,4-dihydrobenzothieno[2,3-C]pyridine,
1-iso-propyl-1,2,3,4-tetrahydrobenzothieno[2,3-C]pyridine,
1-iso-propyl-1,2,3,4-tetrahydro-5H-benzothieno[2,3-C]azepine,
1-ethyl-1,2,3,4-tetrahydrobenzothieno[2,3-C]pyridine,
1-ethyl-1,2,3,4-tetrahydro-5H-benzothieno[2,3-C]azepine,
1-propyl-1,2,3,4-tetrahydrobenzothieno[2,3-C]pyridine,
1-propyl-1,2,3,4-tetrahydro-5H-benzothieno[2,3-C]azepine,
1-(β-diethylaminoethyl)-6-hydroxy-1,2,3,4-tetrahydrobenzothieno[2,3-C]pyridine,
1-methyl-1,2,3,4-tetrahydrobenzothieno[2,3-C]pyridine,
1-methyl-1,2,3,4-tetrahydro-5H-benzothieno[2,3-C]azepine,
1-(3',4'-dimethoxyphenyl)-1,2,3,4-tetrahydrobenzothieno[2,3-C]pyridine,
1-(3',4'-dimethoxyphenyl)-1,2,3,4-tetrahydro-5H-benzothieno[2,3-C]azepine,
6-chloro-1-ethyl-1,2,3,4-tetrahydrobenzothieno[2,3-C]pyridine,
6-chloro-1-ethyl-1,2,3,4-tetrahydro-5H-benzothieno-[2,3-C]azepine,
1-[4'-(N-methylpiperidyl)]-7-trifluoromethyl-1,2,3,4-tetrahydrobenzothieno[2,3-C]pyridine,
1-[β-N-hydroxyethylpiperazino)ethyl]-7-methoxy-1,2,3,4-tetrahydrobenzothieno[2,3-C]pyridine, and
6-hydroxy-1-(N-methylpiperazinoethyl)-1,2,3,4-tetrahydrobenzothieno[2,3-C]pyridine.

The novel compounds of the present invention may be used as intermediates in the preparation of more complex chemical and pharmaceutical compounds, and because of their antiserotonin activity are valuable pharmacological tools. In addition, they are useful as pharmaceutical agents, per se, because of their antipsychotic properties, especially their ability to control antisocial aggressive behavior when administered to animals. For example, the compounds 1-methyl-1,2,3,4-tetrahydrobenzothieno[2,3-C]pyridine, 1-ethyl-1,2,3,4-tetrahydrobenzothieno[2,3-C]pyridine, 1-ethyl-1,2,3,4-tetrahydro-5H-benzothieno[2,3-C]azepine, 1,2,3,4-tetrahydrobenzothieno[2,3-C]pyridine and 6-chloro-1-ethyl-1,2,3,4-tetrahydrobenzothieno[2,3-C]pyridine have shown at a safe and effective dose of approximately 10 mg./kg. intraperitoneally an ability to decrease or inhibit the antisocial behavioral characteristics such as aggressiveness, vicousness and persistence for fighting, induced by isolation in mice. The compounds were found to have $LD_{50}$'s in mice in excess of 100 mg./kg. intraperitoneally in behavioral studies conducted in accordance with procedures outlined by Irwin in "Animal and Clinical Pharmacologic Techniques in Drug Evaluation," J. H. Nodine and P. E. Siegler, Ed., Year Book Publishers, Inc. 1964, pp. 36–54.

The following compounds were found to lower blood pressure when administered in 3.0 and 10.0 mg./kg. intravenous doses to the vagotomized, anesthesized dog preparation, which is a standard animal preparation for testing for antihypertensive activity.

1-ethyl-1,2,3,4-tetrahydrobenzothieno[2,3-C]pyridine,
1,2,3,4-tetrahydrobenzothieno[2,3-C]pyridine,
1-methyl-1,2,3,4-tetrahydrobenzothieno[2,3-C]pyridine,
1-iso-propyl-1,2,3,4-tetrahydrobenzothieno[2,3-C]pyridine,
2-methyl-1,2,3,4-tetrahydrobenzothieno[2,3-C]pyridine,
1-propyl-1,2,3,4-tetrahydrobenzothieno[2,3-C]pyridine,
1-(3,4-dimethoxybenzyl)-1,2,3,4-tetrahydrobenzothieno[2,3-C]pyridine, and
2-β-hydroxyethyl-1-methyl-1,2,3,4-tetrahydrobenzothieno[2,3-C]pyridine, The novel compounds in which R is B—Am are also useful as they form salts with penicillins which can be used to aid in the isolation and purification of the antibiotics.

Acid addition salts of the compounds of the present invention may be conveniently prepared by contacting the compounds which are capable of forming such salts with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the salt forming compounds with a suitable alkylating agent such as dimethyl sulfate or an alkyl halide such as methyl chloride, methyl iodide or ethyl bromide.

When intended for use as pharmaceuticals, the compounds are preferably combined with a major amount of one or more suitable pharmaceutical diluents and formed into unit dosage forms. Such dosage forms provide suitable means for oral and parenteral administration.

The pharmaceutical diluents which may be employed be either liquid or solid, but the preferred liquid carrier is water. In the event the compound is not soluble in water a pharmaceutically acceptable organic solvent such as propylene glycol may be employed.

Solid pharmaceutical diluents such as starch, sugar and talc can be utilized to form powders which can in turn be used as such or may be tableted or encapsulated. In addition to the forementioned material, a wide variety of conventional pharaceutical lubricants, disintegrating agents, flavoring agents and the like, may also be employed.

The unit dosage forms may contain a concentration of 0.1% to 10% or more by weight of one or more of the novel compounds. Generally, such dosage forms will contain about 5 to 250 mg. of the active ingredients. One or more of such dosage forms may be administered daily.

The following examples are presented to illustrate this invention:

EXAMPLE 1

β-(3-thianaphthenyl)ethylamine

To a suspension of 21 g. (0.55 mole) of lithium aluminum hydride in 450 ml. of anhydrous ether is added a solution of 31.7 g. (0.18 mole) of 3-syanomethylthianaphthene in 350 ml. of anhydrous ether in 45 minutes. The mixture is stirred at room temperature for 3 hours after which the complex is decomposed by the dropwise addition of 80 ml. of water. The solids are removed by filtration and washed with ether. The filtrate is dried and concentrated in vacuo to yield a brown oil which is fractioned to yield β-(3-thianaphthenyl)ethylamine in the form of a clear liquid, B.P. 109–110°/0.3 mm.

Analysis.—Calcd. for $C_{10}H_{11}NS$ (percent): C, 67.75; H, 6.26; N, 7.90. Found (percent): C, 67.49; H, 6.50; N, 7.92.

EXAMPLE 2

N-β-(3-thianaphthenylethyl)acetamide

To 5.6 g. (0.03 mole) of β-(3-thianaphthenyl)ethylamine is added 72 ml. of 20% sodium hydroxide solution with cooling in 10 minutes. Acetic anhydride (20 ml.) is then added dropwise with cooling within 15 minutes, after which the mixture is stirred with cooling for 1 hour and at room temperature for 16 hours. The mixture is extracted three times with 100 ml. portions of ether. The extracts are combined and washed three times with 50 ml. of brine, dried, and concentrated in vacuo to yield a clear liquid which is crystallized from benzene-petroleumether to yield N-β-(3-thianaphthenylethyl)acetamide in the form of a white crystalline solid, M.P. 67–68.5°.

Analysis.—Calcd. for $C_{12}H_{13}NOS$ (percent): S, 14.62. Found (percent): S, 14.73.

EXAMPLE 3

1-methyl-3,4-dihydrothianaphtheno[2,3-C]pyridine

A mixture of 2.4 g. of phosphorus pentoxide, 1.3 g. of N-β-(3-thianaphthenylethyl)acetamide, and 2.4 g. of phosphorus oxychloride in 40 ml. of anhydrous xylene (over sodium) is allowed to reflux under nitrogen for 70 minutes.

The mixture is decomposed with ice and the mixture stirred until a clear aqueous layer is formed. The aqueous layer is separated, washed with benzene, made basic with concentrated sodium hydroxide solution, and extracted with three 100 ml. portions of benzene. The combined benzene extracts are dried over anhydrous sodium sulfate and the solvent distilled under diminished pressure to give a solid product. After one recrystallization from petroleum ether 1-methyl-3,4-dihydrothianaphtheno[2,3-C]pyridine, M.P. 73.5°, in the form of light yellow needles is obtained.

Analysis.—Calcd. for $C_{12}H_{11}NS$ (percent): S,15.97. Found (percent): S, 15.98.

EXAMPLE 4

1-methyl-1,2,3,4-tetrahydrobenzothieno[2,3-C]pyridine hydrochloride

To a dispersion of 1.6 g. (0.042 mole) of lithium aluminum hydride in 250 ml. of ether is added a solution of 2.1 g. (0.01 mole) of 1-methyl-3,4-dihydrobenzothieno[2,3-C]pyridine in 50 ml. of ether in 20 minutes, after which it is refluxed for 5 hours. The mixture is cooled and the complex decomposed with the dropwise addition of 15 ml. of water. The solids are removed by filtration and the filtrate dried and made acidic with etheral hydrogen chloride. The resulting solids are collected and recrystallized twice from ethanol to yield 1-methyl-1,2,3,4-tetrahydrobenzothieno[2,3-C]pyridine hydrochloride in the form of a white crystalline solid, M.P. 255–257°.

*Analysis.*—Calcd. for $C_{12}H_{14}ClNS$ (percent): C, 60.12; H, 5.88; N, 5.83; S, 13.38. Found (percent): C, 60.16; H, 5.79; N, 5.87; S 13.46.

EXAMPLE 5

N-propionyl-β-(3-thianaphthenyl)ethylamine

To a solution of 6.15 g. (0.0663 mole) of propionyl chloride in 60 ml. of benzene is added a solution of 5.2 g. (0.0663 mole, 5.3 ml.) of pyridine and 10 g. (0.0564 mole) of β-(3-thianaphthenyl)ethylamine in 50 ml. of benzene in 0.5 hour at 0°, and the mixture is stirred at 25° for 16 hours. Water (100 ml.) is added and stirred 5 minutes. The organic layer is separated, washed with 100 ml. of 10% hydrochloric acid and 50 ml. of brine, dried and concentrated to yield an oil which is crystallized twice from benzene/petroleum ether to yield N-propionyl-β-(3-thianaphthenyl) ethylamine in the form of a white solid, M.P. 71–72.5°.

*Analysis.*—Calcd. for $C_{13}H_{15}NOS$ (percent): C, 66.92; H, 6.48; N, 6.01; S, 13.74. Found (percent): C, 67.12; H, 6.18; N, 6.12; S, 13.97.

EXAMPLE 6

1-ethyl-3,4-dihydrothianaphthene[2,3-C]pyridine

A mixture of 11.1 g. (0.078 mole) of phosphorus pentoxide, 11.1 g. (0.072 mole) of phosphorus oxychloride and 6.4 g. (0.072 mole) of N-propionyl-β-(3-thianaphthenyl)ethylamine in 150 ml. of xylene is refluxed for 2 hours. It is cooled, 200 ml. of water added and the mixture stirred 0.5 hour. The aqueous layer is separated and basified with sodium hydroxide. It is extracted twice with 125 ml. portions of ether which are dried and concentrated to yield 1-ethyl-3,4-dihydrothianaphthene[2,3-C]pyridine in the form of a yellow solid, M.P. 72–75°.

EXAMPLE 7

1-ethyl-1,2,3,4-tetrahydrobenzothieno[2,3-C]pyridine hydrochloride

To a dispersion of 3.9 g. (0.10 mole) of LAH in 150 ml. of ether is added 5.5 g. (0.026 mole) of 1-ethyl-3,4-dihydrobenzothieno[2,3-C]pyridine in 50 ml. of ether in 15 minutes, after which it is refluxed for 4 hours. The complex is decomposed with 25 ml. of water and filtered. The filtrate is dried and acidified with ethereal hydrogen chloride. The solids are recrystallized from methanol to yield 1-ethyl - 1,2,3,4 - tetrahydrobenzothieno[2,3-C]pyridine hydrochloride in the form of a white solid in two crops, M.P. 286–287°.

*Analysis.*—Calcd. for $C_{13}H_{16}ClNS$ (percent): C, 61.52; H, 6.36; N, 5.52; S, 12.64. Found (percent): C, 61.79; H, 6.34; N, 5.66; S, 12.62.

EXAMPLE 8

1-propyl-1,2,3,4-tetrahydrobenzothieno[2,3-C]pyridine hydrochloride

To a dispersion of 9.5 g. (0.25 mole) of LAH in 300 ml. of ether is added a solution of 14.6 g. (0.06 mole) of 1-propyl - 3,4 - dihydrobenzothieno[2,3-C]pyridine in 100 ml. of ether in 10 minutes after which it is refluxed for 4 hours. The complex is decomposed with 38 ml. of water and filtered, the filtrate is dried and acidified with ethereal HCl. The solids are recrystallized twice from ethanol to yield 1-propyl-1,2,3,4-tetrahydrobenzothieno[2,3-C]pyridine hydrochloride in the form of a white solid, M.P. 266–268°.

*Analysis.*—Calcd. for $C_{14}H_{18}ClNS$ (percent): S, 11.96. Found (percent): S, 12.10.

EXAMPLE 9

1-iso-propyl-1,2,3,4-tetrahydrobenzothieno[2,3-C] pyridine hydrochloride

To a dispersion of 9.5 g. (0.25 mole) of LAH in 300 ml. of ether is added a solution of 14.4 g. (0.06 mole) of 1-isopropyl-3,4-dihydrobenzothieno[2,3-C]pyridine in 100 ml. ether in 10 minutes, after which it is refluxed for 6.5 hours. The complex is decomposed with 38 ml. of water and filtered. The filtrate is dried and acidified with ethereal HCl. The solids are recrystallized twice from ethanol to yield 1-iso-propyl - 1,2,3,4 - tetrahydrobenzothieno[2,3-C] pyridine hydrochloride in the form of a white solid, M.P. 248–249°.

*Analysis.*—Calcd. for $C_{14}H_{18}ClNS$ (percent): S, 11.96. Found (percent): S, 11.85.

EXAMPLE 10

Diethyl-α-(5-chloro-3-thianaphthenylmethyl)malonate

To a solution of 3.8 g. (0.16 mole) of Na in 175 ml. of ethanol is added 33 g. (0.2 mole) of diethyl malonate and the mixture is stirred 1 hour at 25°. A solution of 35.6 g. (0.14 mole) of 5-chloro-3-bromomethylthianaphthene in 100 ml. of benzene is added in 15 minutes, the mixture is stirred at 25° for 1 hour and refluxed 7 hours. The solution is cooled, diluted to 1.5 liters with water and extracted three times with 200 ml. portions of ether. The combined extracts are washed twice with 75 ml. portions of brine, dried and concentrated to yield diethyl-α-(5-chloro-3-thianaphthenylmethyl)malonate in the form of a yellow red oil.

EXAMPLE 11

α-(5-chloro-3-thianaphthenylmethyl)malonic acid

To a solution of 45.2 g. of KOH in 45 ml. of water is added 100 ml. of ethanol and 45.2 g. (0.13 mole) of diethyl-α-(5-chloro-3 - thianaphthenylmethyl)malonate and the mixture is refluxed 22 hours. The alcohol is removed in vacuo after which 200 ml. of water is added and the mixture extracted twice with 100 ml. portions of ether. The aqueous solution is treated with activated charcoal, acidified with concentrated HCl and cooled. The solids are collected and dried to yield α-(5-chloro-3-thianaphthenylmethyl)malonic acid in the form of a yellow solid, M.P. 175–177°.

*Analysis.*—Calcd. for $C_{12}H_9ClO_4S$ (percent): S, 11.26. Found (percent): S, 11.42.

EXAMPLE 12

β-(5-chloro-3-thianaphthenyl)propionic acid

α-(5-chloro-3-thianaphthenylmethyl)malonic acid (13.5 g., 0.048 mole) is heated at 190–195° for two hours. It is cooled to 25° and 75 ml. are dissolved. It is cooled, extracted twice with 35 ml. of chloroform, treated with activated charcoal and acidified with 10% HCl solution. The solids are collected, washed and dried to yield β-(5-chloro-3-thianaphthenyl)propionic acid. An analytical sample is prepared by recrystallizing twice from ethanol and twice from methanol to yield β-(5-chloro-3-thianaphthenyl)propionic acid in the form of a yellow solid, M.P. 187–189°.

*Analysis.*—Calcd. for $C_{11}H_9ClO_2S$ (percent): C, 54.91; H, 3.77; Cl, 19.74; S, 13.32. Found (percent): C, 55.09; H, 3.79; Cl, 14.83; S, 13.27.

EXAMPLE 13

β-(5-chloro-3-thianaphthenyl)ethylamine hydrochloride

A mixture of 26.8 g. (0.11 mole) of α-(5-chloro-3-thianaphthene)propionic acid and 57 g. (35 ml., 0.48 mole) of $SOCl_2$ is heated to 50° in 0.5 hour and maintained at 50–52° for 1 hour. The excess $SOCl_2$ is removed in vacuo. Benzene (50 ml.) is added to the residue and concentrated to yield 30 g. (theory 29 g.) β-(5-chloro-3-thianaphthenyl)propionyl chloride in the form of a yellow solid.

A mixture of 32 g. (0.12 mole) of β-(5-chloro-3-thianaphthenyl)propionyl chloride and 34 g. (0.51 mole) of $NaN_3$ in 200 ml. of toluene is refluxed for 23.5 hours. The mixture is cooled, filtered and the filtrate concentrated to yield a brown oil.

To the above oil is added 100 ml. of concentrated HCl with stirring at 25° for 15 minutes, at 80° for 0.5 hour after which it is refluxed for 6 hours. The mixture is cooled to 25° and 100 ml. of ether added and stirred 0.5 hour. The solids are collected, washed with ether and dried to yield a solid, M.P. 215–237°. An analytical sample is prepared by recrystallizing from activated charcoal-treated ethanol to yield β-(5-chloro-3-thianaphthenyl)ethylamine hydrochloride in the form of a white solid, M.P. 248–250°.

*Analysis.*—Calcd. for $C_{10}H_{11}Cl_2NS$ (percent): C, 48.38; H, 4.47; N, 5.64; S, 12.91. Found (percent): C, 48.18; H, 4.64; N, 5.48; S, 13.02.

EXAMPLE 14

N-propionyl-β-(5-chloro-3-thianaphthenyl)ethylamine

To a solution of 5.9 g. (0.06 mole) of propionyl chloride in 100 ml. of benzene is added a solution of 5.1 g. (0.06 mole, 5.2 ml.) of pyridine and 6.7 g. (0.03 mole) of β-(5-chloro-3-thianaphthenyl)ethylamine in 100 ml. of benzene in 20 minutes at 10°. The mixture is stirred for 17 hours at 25° after which 100 ml. of water and 75 ml. of benzene are added and the mixture heated until all solids are dissolved. The organic layer is separated and washed successively with 50 ml. of 10% HCl, twice with 100 ml. portions of 5% NaOH and once with 50 ml. of brine. It is dried ($Na_2SO_4$) and concentrated to yield N-propionyl-β-(5-chloro-3-thianaphthenyl)ethylamine in the form of a yellow solid, M.P. 93–190°.

EXAMPLE 15

6-chloro-1-ethyl-3,4-dihydrobenzothieno[2,3-C]pyridine

A mixture of 13.9 g. (0.1 mole) of $P_2O_5$, 13.9 g. (0.09 mole) of $POCl_3$ and 9.2 g. (0.03 mole) of N-propionyl-β-(5-chloro-3-thianaphthenyl)ethylamine in 250 ml. of xylene is refluxed for 2 hours. It is cooled, 500 ml. of water added and stirred at 80° for 0.5 hour. The aqueous layer is separated, cooled, extracted with 100 ml. of chloroform and filtered through diatomaceous earth. It is basified, while cooling, with flake NaOH. The precipitated solids are collected, washed with water, and dried to yield 6-chloro-1-ethyl-3,4-dihydrobenzothieno[2,3-C]pyridine in the form of a yellow solid, M.P. 105–108°.

EXAMPLE 16

6-chloro-1-ethyl-1,2,3,4-tetrahydrobenzothieno[2,3-C]pyridine hydrochloride

To a dispersion of 2.34 g. (0.06 mole) of $LiAlH_4$ in 100 ml. of ether is added 3.83 g. (0.015 mole) of 6-chloro-1-ethyl-3,4-dihydrobenzothieno[2,3-C]pyridine in 150 ml. of ether in 15 minutes and refluxed for 8 hours. The complex is decomposed with 15 ml. of water and the mixture filtered. The filtrate is dried and concentrated to yield a solid which is redissolved in 125 ml. of ether and acidified with ethereal HCl. The solids are collected and recrystallized from 500 ml. of refluxing $H_2O$ to yield 6-chloro-1-ethyl - 1,2,3,4 - tetrahydrobenzothieno[2,3-C]pyridine hydrochloride in the form of a white solid, M.P. 333–335°.

EXAMPLE 17

1-(3,4-dimethoxybenzyl)-3,4-dihydrobenzothieno[2,3-C]pyridine

To a solution of 16.7 g. (0.117 mole) of phosphorus pentoxide and 16.7 g. (0.109 mole, 10 ml.) of phosphorus oxychloride in 280 ml. of anhydrous xylene is added 14.6 g. (0.0412 mole) of N-(3,4-dimethoxyphenylacetyl)-β-3-thianaphthylethylamine in 2 minutes. The mixture is heated to 120° in 0.5 hour and maintained for 40 minutes. The mixture is cooled to 25° and poured into 400 ml. of ice water. The mixture is then added back to the original reaction flask and stirred with 10% sodium hydroxide solution (300 ml.) and 200 ml. of benzene at 50° for 3 hours. The organic layer is separated, treated with activated charcoal, dried, and concentrated to yield 1 - (3,4 - dimethoxybenzyl) - 3,4 - dihydrobenzothieno [2,3-C]pyridine as a dark yellow oil which solidifies upon cooling.

EXAMPLE 18

1-(3,4-dimethoxybenzyl)-1,2,3,4-tetrahydrobenzothieno[2,3-C]pyridine hydrochloride A solution of 6.2 g. (0.018 mole) of 1-(3,4-dimethoxybenzyl)-3,4-dihydrobenzothieno[2,3-C]pyridine in 100 ml. of benzene is added to a dispersion of 2.8 g. (0.075 mole) of LAH in 200 ml. of ether in 10 minutes and refluxed for 3.5 hours. The complex is decomposed with 15 ml. of water. The solids are removed by filtration; the filtrate concentrated to yield an oil which is dissolved in 250 ml. of ether and filtered through celite. The filtrate is again concentrated to yield the crude base.

A portion of this material (1.5 g.) is dissolved in 100 ml. of ether and adjusted to acidity by the addition of ethereal hydrogen chloride. The resulting solids are collected and recrystallized from 200 ml. of ethanol, concentrated to 75 ml., and diluted with ether to yield 1-(3,4-dimethoxybenzyl) - 1,2,3,4 - tetrahydrobenzothieno[2,3-C]pyridine hydrochloride as a yellow solid; M.P. 222–227°.

*Analysis.*—Calcd. for $C_{20}H_{22}ClNO_2S$ (percent): N, 3.73; S, 8.54. Found (percent): N, 3.65; S, 8.22.

I claim:
1. A compound of the formula

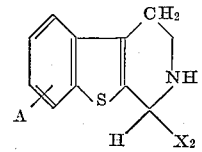

in which A is hydrogen or 6-chloro and $X_2$ is lower alkyl of 1 to 4 carbon atoms.

2. A compound of claim 1 in which A is hydrogen and $X_2$ is ethyl.
3. A compound of claim 1 in which A is hydrogen and $X_2$ is methyl.
4. A compound of claim 1 in which A is hydrogen and $X_2$ is isopropyl.
5. A compound of claim 1 in which A is 6-chloro and $X_2$ is ethyl.
6. A compound of claim 1 in which A is hydrogen and $X_2$ is propyl.

No references cited.

ALEX MAZEL, Primary Examiner

JOSE TOVAR, Assistant Examiner

U.S. Cl. X.R.

424—263